May 20, 1958
J. J. SHUTKUFSKI
2,835,039
MASTER GAGE
Filed July 6, 1955
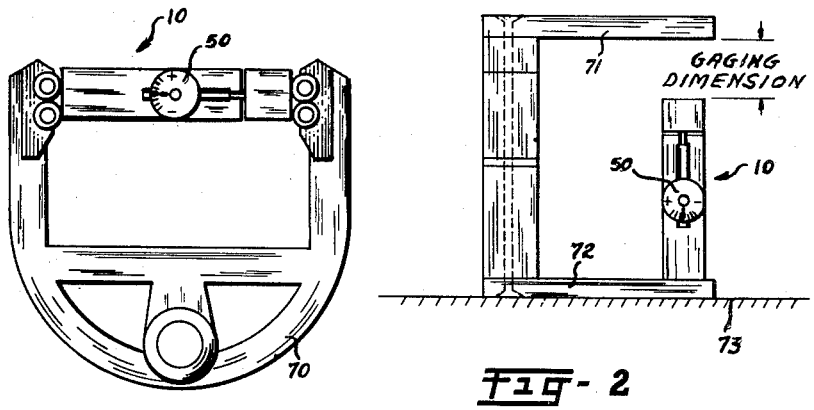
Fig-1
Fig-2
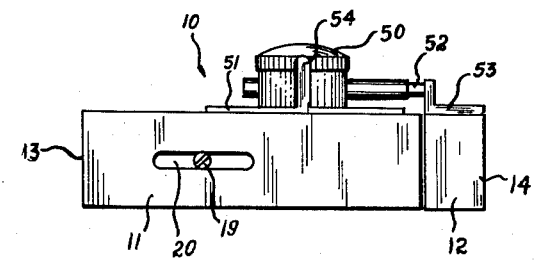
Fig-3
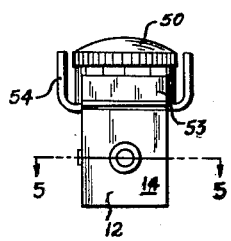
Fig-4
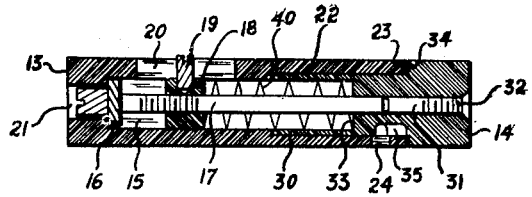
Fig-5
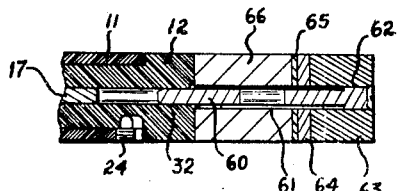
Fig-6
INVENTOR
JOHN J. SHUTKUFSKI
BY W.E. Sherwood
ATTORNEY – # United States Patent Office 2,835,039
Patented May 20, 1958

2,835,039

MASTER GAGE

John J. Shutkufski, Lexington, Ky., assignor of one-fourth to William E. Sherwood, Lexington, Ky.

Application July 6, 1955, Serial No. 520,201

7 Claims. (Cl. 33—147)

This invention relates to a precision gage apparatus and more particularly to a master gage setting block adapted for employment under measuring conditions less likely to involve error in judgment on the part of the user.

As is known, the master gages employed in the calibration of production gages customarily are retained in a gage room under custody of highly skilled artisans. Moreover, such master gages are extremely accurate and often are quite expensive. However, in the last analysis the accuracy of the production gage used by the worker in determining the acceptability of the manufactured product depends upon the calibration given to that production gage by the artisan who matches the production gage to the master gage. The accuracy of this match essentially depends upon the experience, skill and "feel" of the master artisan and due to fatigue or other physiological reason this accuracy may at times become suspect.

In order to avoid this danger of inaccuracy various elaborate bench mounted control devices have heretofore been devised to insure a proper matching of the production and master gages. In contrast to such elaborate and expensive control means the present invention is directed toward a relatively simple and inexpensive means for diminishing any error in judgment on the part of the artisan employing the master gage.

One object of the invention is to provide a visual indicator in combination with a master gage setting block and without sacrifice of accuracy in the block assembly.

A second object is to provide an adaptable master gage setting block suitable for attachment of supplemental gage elements and without sacrifice of accuracy in the block assembly.

A third object is to provide a master gage setting block having relatively movable extreme measuring edges or elements.

A further object is to provide a master gage setting block having relatively movable measuring elements and equipped with a dial indicator whose sensitive actuating means is permitted to move through a protected range of travel.

Other objects and advantages will become more apparent as the description proceeds when considered in conjunction with the accompanying drawings in which:

Fig. 1 is a diagrammatic view indicating one usage of the improved master gage.

Fig. 2 is a diagrammatic view indicating a second usage of the improved master gage.

Fig. 3 is a side elevation of the master gage setting block.

Fig. 4 is an end elevation of the same block.

Fig. 5 is a sectional view taken on line 5—5 of Fig. 4, and turned ninety degrees with respect thereto.

Fig. 6 is a sectional view similar to Fig. 5 and showing the attachment of supplementary gage blocks to the master gage setting block.

The improved master gage of this invention will be found by those skilled in the art to be adaptable to many diversified uses and it will be understood that the following description is to be interpreted in an illustrative and not in a limiting sense. For example, the invention will have ready application to the calibration of various types of external measuring gages, such as snap gages; to the establishment of settings of measuring machines; to relative height, width or length comparisons; and to use with other master gages in calibration of internal measuring gages.

With these potential applications in mind, reference first is made to Figs. 3 to 5 in which the master gage 10 is shown as comprising a gage frame 11 and a movable gage head 12 mounted in the frame. Preferably these members are formed of tool steel or equivalent and are hardened and ground on all surfaces contributing to accuracy of measurement. For example, the end surfaces 13 and 14 of the frame and head, respectively, are preferably square, parallel and flat within Hoke block tolerances.

Frame member 11 is provided with a bore 15 along its central axis having a dimension suitable to receive the head 16 of a threaded rod 17, which rod is adapted to adjust the longitudinal position of a spring retainer 18. This retainer is held against rotation by a laterally projecting pin 19 adapted to engage in a lateral keyway 20 communicating with the frame bore 15 and extending to the exterior of the frame member. The end 13 of the frame is provided with an aperture 21 through which a tool such as a screwdriver may be inserted to engage with the slotted head 16 of the rod and to adjust the setting of the spring retainer by rotation of the rod.

At its opposite end the frame is provided with an enlarged bore 22 carefully centered and machined for reception of the closely fitting annular interior end 30 of the gage head. Adjacent flat end 23 of the gage frame a lateral threaded aperture is provided for reception of set screw 24, having a dual purpose which will later become apparent.

Gage head 12 is formed with a centrally arranged axial bore 31 threaded at one end 32 and smooth at the other end into which the extreme end of rod 17 is adapted to project. On its interior end, the gage head is formed with the annular wall 30 terminating in a bottom ledge 33 against which an enclosed compression spring is adapted to bear.

Spring 40, which in one satisfactory arrangement with a gage having a rated dimension of 4.500 inches and with a plus tolerance of 0.000 inch and an extremely small minus tolerance, may comprise a 0.046 inch diameter piano wire arranged in helical form and having a free length of 1.750 inches. This spring is effective to move the gage head to the right, as shown in Fig. 5, when subjected to the compression afforded by the positioning of spring retainer 18. The gage head, moreover, is formed with a flat ledge 34 adapted to seat against the flat end 23 of the gage frame when the master gage setting block is fully closed corresponding to minimum separation of the measuring elements.

Laterally of the gage head a keyway 35 is provided and into which the end of set screw 24 is adapted to project. The action of this set screw and keyway serves to prevent rotation of the gage head with respect to the gage frame and at the same time to limit the maximum extent of movement of the gage head under the influence of the compression spring and correspondingly determines the maximum separation of the measuring elements. By means of the structure thus far described, it is apparent that the assembled gage block 10 will have one measuring distance between its faces 13 and 14 when the set screw engages with the end of keyway 35 (as shown in Fig. 5) and a second but smaller measuring distance between the faces 13 and 14 when the ledge 34 abuts against the end 23 of the gage frame. The difference between these two measuring distances may be designed for any value desired, but I prefer to make such distance comparatively small as for example about 0.010 inch. Furthermore, the specified or rated measuring distance between the faces, for which the gage is designed, normally is at some intermediate position between the fully expanded and fully closed position of such gage assembly. Preferably the specified measuring distance is at about the mid point between these extremes so that, in the example given, the distance between the faces with the gage head fully extended will be plus 0.005 inch from the specified value.

For the purpose of determining visually, rather than by manual contact or "feel," the point at which the gage block has acquired its specified measuring distance, the invention contemplates the use of a conventional dial indicator 50 in conjunction with the above described gage frame and gage head. This indicator may be of any suitable type adapted to have an intermediate zeroing point and with its pointer arranged to indicate measurements on each side of that zero point. For example, the shock proof mounted indicator of the type shown in Emery Patent 2,476,713 may conveniently be employed. I prefer to mount the dial indicator upon a base plate 51 attached to one side of the gage frame 11 with the measuring plunger 52 extending in the direction of the measuring face 14. Upon the corresponding side of the gage head a bumper block or abutment 53 is suitably affixed in the path of the plunger 52. Suitable guard means 54 may be positioned around the delicate indicator to prevent any direct shock being transmitted thereto during manipulation of the gage block.

As a result of the arrangement thus described the indicator plunger is at all times under the influence of the position of abutment 53 regardless of whether the gage surface 14 is or is not in measuring contact with another object. Since the plunger is never in contact with a measuring surface, the indication given by the pointer of the indicator dial is entirely visual and does not reflect the physical impression which the artisan may have as to whether the measuring surface 14 is matching with a loose or a tight fit. On the contrary, the position of the surface 14 at all times is operative upon the attached abutment 53 and through the plunger 52 upon such pointer. This is an important feature of my invention, since by watching the indicator the artisan can disregard his physical "feel" or sensation and rely with safety upon the setting of the indicator pointer as to the matching fit of the gage.

As a result, the improved gage of my invention can be used by comparativly inexperienced artisans with superior rsults. Preferably, the calibration of indicator 50 is such that at the rated dimension of the gage, while the measuring elements are separated at a distance intermediate their maximum and minimum potential separations, the pointer of the gage reads zero. After the gage is assembled and the dial indicator is calibrated the master gage is ready for repeated usage without further checking. The delicate springs of the indictor are subjected to no greater extension than is permitted by the limited movement of the abutment 53 and thus function within a protected range of travel. The separate, comparatively heavy spring 40 is the means which takes any abuse if the artisan attempts to force the gage block between the jaws of a snap gage, for example.

In assembling the gage 10 with the indicator, and in the example given above, the arrangement as shown in Fig. 3 would indicate a reading of plus 0.005 inch on the indicator dial. As the gage head 12 is moved to the left the indicator dial would register zero at the time the gage assumes the specified measuring distance between faces 13 and 14, and would register minus 0.005 inch when the gage is fully closed. As shown, the master gage block preferably is square in cross section, but may be of any other geometrical shape if desired without departing from the invention. I prefer to employ a square shaped block, however, since such a block is particularly advantageous in connection with the feature now to be described, namely, of employing supplementary Hoke blocks.

As shown in Hoke Patent 1,491,098 many arrangements for effecting precise measurements may be achieved by mounting a series of separate gage blocks upon an interiorly disposed rod. The present invention includes as an important feature the threaded aperture 32 in the gage head and into which a suitable threaded stud 60, best shown in Fig. 6, may be adjustably inserted.

Within the central aperture of the Hoke blocks a centering sleeve 61 is disposed, this sleeve being interiorly threaded adjacent each end. A second threaded stud 62 provided with a slotted head adapted to fit within the countersunk aperture of the outermost block, is disposed for engagement with the centering sleeve. By means of this arrangement any desired number of Hoke blocks, as for example the blocks shown at 63, 64, 65 and 66, may be employed in conjunction with the gage head 12 in order to provide a master gage setting block of a desired length.

Since the accuracy of the gage frame 11 and the gage head 12 may be made at least as good as that of the attached blocks, no loss of block accuracy results from their employment in this fashion. Moreover, the advantageous use of the dial indicator is preserved in the composite gage, without requiring any rearrangement of the same.

As shown in Fig. 1, the master gage, either with or without the attached blocks, may be used to establish the calibration of an external measuring gage, such as snap gage 70. In Fig. 2, an arrangement is shown in which a suitably mounted series of Hoke blocks having gage bars 71 and 72 is positioned upon a surface plate 73 for cooperative use with my gage block 10, all for the purpose of calibrating an internal gage, such as a plug gage (not shown) which may be inserted in the space indicated by the gaging dimension.

It will be understood by those skilled in the art that the improved gage block is not limited to use in measuring between the flat surfaces 13 and 14 of the ends of the relatively movable gage members. On the contrary, measuring elements, other than flat surfaces, may readily be employed, as indicated by the Hoke patent. For example, such elements may comprise scribers, spherical end faces, pointed end faces, gage bars, and the like.

While I have described a preferred embodiment of my invntion, it is to be understood that the foregoing description and examples are for purposes of illustration only and no limitation is to be inferred except as found in the appended claims.

What is claimed is:

1. A gauge comprising an elongated frame member supporting at one end a first measuring element and having at a second end an apertured flat surface, said frame member having an axial bore extending through at least a part thereof and terminating at said flat surface, a gauge head having at one end a portion telescopically disposed in said bore and provided intermediate its ends with a flat ledge portion adapted to abut against said flat surface at the minimum measuring distance of said gauge, a second measuring element supported at the second end of said gauge head, resilient means mounted in said bore and arranged to move said measuring elements apart, means for adjusting the setting of said resilient means, means for limiting the maximum separation of said elements, means for indicating the extent of separation of said elements and means mounted upon said gauge head for actuating said indicating means and disposed in operative contact therewith at all times.

2. A gauge as defined in claim 1 wherein said first measuring element is provided with a small aperture providing access to the means for adjusting the setting of the resilient means.

3. A gauge as defined in claim 1, wherein said indicating means comprises a dial indicator mounted upon said frame member and having a zero setting corresponding to the rated dimension of the gauge.

4. A gauge as defined in claim 1, wherein said first measuring element comprises the surface of said one end of said frame member and said second measuring element comprises the surface of said second end of said gauge head.

5. In a gauge comprising an elongated frame member supporting at one end a first measuring element forming a portion of the surface of said frame member, said frame member having at a second end an apertured flat surface and having an axial bore extending through at least a part of the frame member and terminating at said flat surface, a gauge head having at one end a portion telescopically disposed in said bore and provided intermediate its ends with a flat ledge portion adapted to abut against said flat surface at the minimum measuring distance of said gauge, a separate gauge member attached to the second end of said gauge head and forming the second measuring element of said gauge, means for detachably joining said separate gauge member to said gauge head, resilient means mounted in said bore and arranged to move said measuring elements apart, means for adjusting the setting of said resilient means, means for limiting the maximum separation of said elements, means for indicating the extent of separation of said elements, and means mounted upon said gauge head for actuating said indicating means and disposed in operative contact therewith at all times.

6. A gauge as defined in claim 5, including a threaded aperture in said second end of said gauge head, said separate gauge member having a bore extending therethrough, and a threaded stud extending through the bore of said separate gauge member and engaging the threaded aperture in said gauge head thereby to mount said separate gauge member securely upon the gauge head and to provide an adaptable gauge having a different rated dimension than when said gauge is employed without said separate gauge member.

7. A gauge as defined in claim 5, including a plurality of separate gauge members attached to the second end of said gauge head.

References Cited in the file of this patent

UNITED STATES PATENTS

| | | |
|---|---|---|
| 1,491,100 | Hoke | Apr. 22, 1924 |
| 1,625,462 | Frauenthal | Apr. 19, 1927 |
| 2,476,713 | Emery | July 19, 1949 |
| 2,707,835 | Gierlich | May 10, 1955 |

OTHER REFERENCES

Lang: Publication in Amer. Mach., page 182, February 13, 1935.